April 5, 1966 T. D. THOMASON ETAL 3,244,186
SOLAR HEATED TENT
Filed Feb. 9, 1960
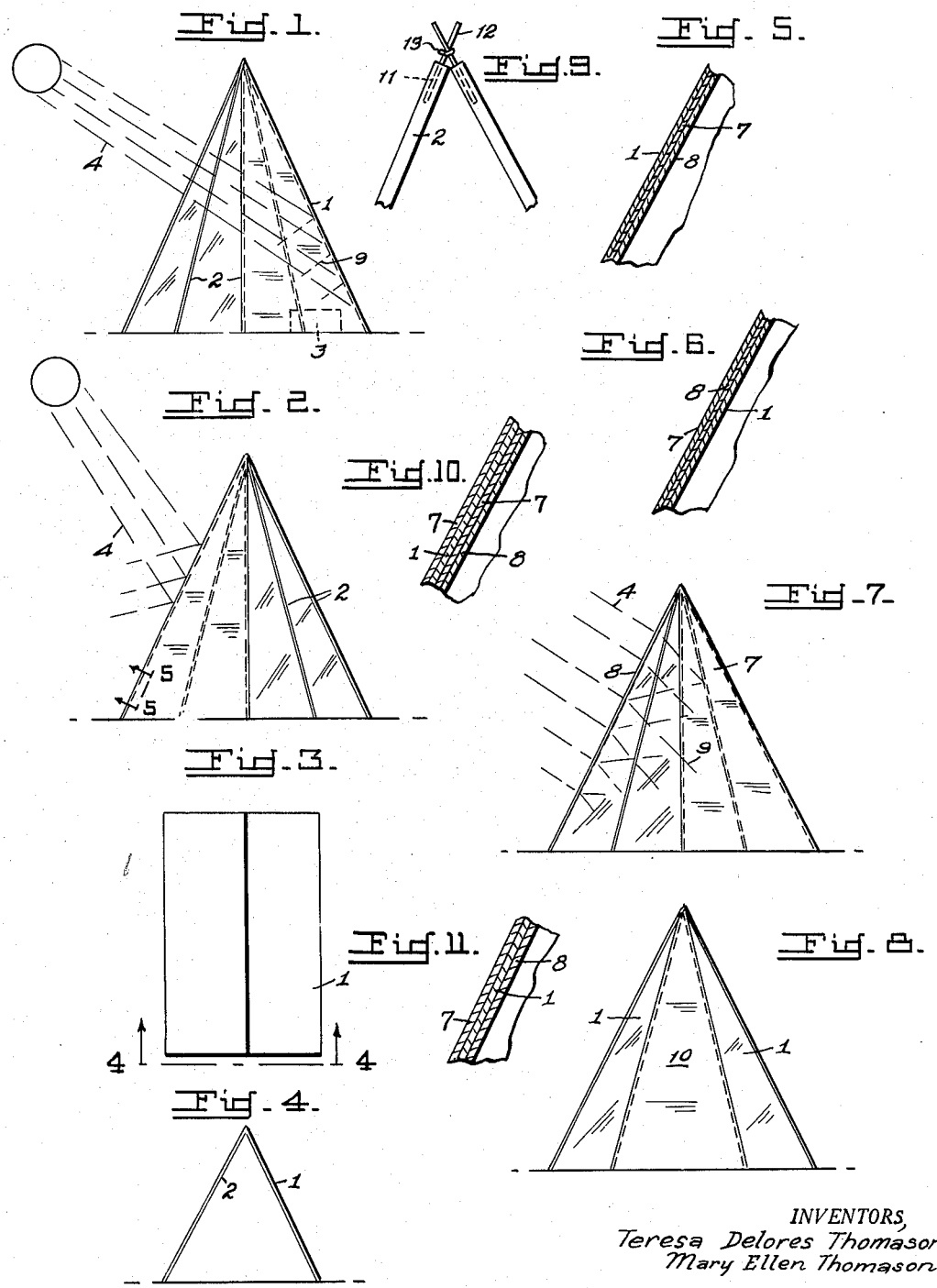
INVENTORS,
Teresa Delores Thomason
Mary Ellen Thomason
By: H. E. Thibodeau
Attorney

United States Patent Office 3,244,186
Patented Apr. 5, 1966

3,244,186
SOLAR HEATED TENT
Teresa Delores Thomason and Mary Ellen Thomason, District Heights, Md. (both of 7354 Walker Mill Road SE., Washington, D.C.)
Filed Feb. 9, 1960, Ser. No. 7,713
2 Claims. (Cl. 135—1)

The present invention relates to a solar heated tent or similar shelter. Such shelter is constructed so that it makes use of the sun's light and heat to warm it in the wintertime, and the shelter is reversible so as to reflect unwanted heat away and provide shade in the shelter for summertime use.

One practical application which we have found for our invention is in the construction of children's play tents. We have found that a tent constructed in accordane with our invention is kept warm on cold winter days by the sunshine and it can be turned 180° about the vertical axis for summertime use so that the occupants are sheltered from solar radiation and are kept shaded. With a shelter in accordance with our invention constructed over a pool, the water and occupants can be kept warmer for cold weather bathing, or cooler and shaded for hot weather bathing. Additionally, a tent constructed in accordance with some embodiments of our invention gives a "picture window" effect on one side with a sweeping view of the countryside while affording full protection against cold winds.

Inasmuch as the materials used in our invention are simple to assemble and readily available at low cost, solar heated tents and shelters in accordance with the teachings disclosed herein can be constructed at a minimum cost and with minimum labor.

In the drawings:

FIGURE 1 is a side elevational view of a pyramidal tent representing one embodiment of our invention, FIGURE 2 is a view similar to that of FIGURE 1 showing the tent reversed for summertime use, FIGURE 3 is a top plan view of a modified structure utilizing solar heat, FIGURE 4 is a front elevational view of the structure of FIGURE 3, as seen along the line 4—4 of FIGURE 3, FIGURE 5 is a fragmentary view of a tent wall section taken along the line 5—5 of FIGURE 2, FIGURE 6 is a view similar to FIGURE 5 showing a modified arrangement of the laminae, FIGURES 7 and 8 are views similar to FIGURE 1 showing modified forms of the invention, FIGURE 9 is a fragmentary detail of an arrangement of tent poles at the apex of a pyramidal tent, and FIGURES 10 and 11 are views similar to FIGURE 5 showing further modified arrangements of the laminae.

Referring to the drawings in detail, reference character 1 illustrates the tent covering material. This material may be transparent or translucent in some of the embodiments or may be opaque in others. The covering material is supported on framework 2 which may take any one of many forms or shapes well-known to the art, two examples being given in FIG. 1 and in FIGS. 3, 4.

Reference character 3 represents a seat or bench-like object, preferably made of concrete blocks, cinder blocks, containers of Glauber's salt, or such. Such object or objects are preferably dull black so as to absorb heat during sunny hours and thus help keep the interior warm at dusk and into the night. If the objects are of great enough heat-storing capacity, the interior may be kept warm for a long time. The incoming sun's rays are illustrated at 4.

In FIG. 1, the covering material is transparent or translucent on the sides exposed to the sun. The other sides may be opaque, transparent or translucent, and are preferably treated with a darkened surface 8 and a reflective surface 7 as exemplified in FIGS. 5 and 6. It is known that approximately half of the sun's energy is visible light energy and approximately half is infra-red energy. When this energy strikes a black surface, as at 8, it is converted into heat and warms the black surface. The warmed black surface, in turn, radiates heat energy at a level of the spectrum below the level of light, that is, infra-red heat energy. Thus, the sun's rays striks surface 8 and are converted into secondary or infra-red heat rays 9 to heat the interior of the shelter by radiated heat as illustrated at 9 and by warming the air which contacts warmed surface 8, thereby setting up warm convection currents. Surface 7 reflects the heat rays down into the tent and prevents or minimizes radiation to the outside. In FIG. 5 the coatings are placed inside the covering and thus the coatings are protected from the weather by the covering, while the darkening coating is protected against damaging sun's rays and excessive heat by the reflective coating. If desired, the coatings may be applied to the outer surface of covering 1 as illustrated in FIG. 6. If so applied the darkened coating 8 will be applied first and the reflective coating 7 applied thereover. A further possible arrangement is to apply the reflective coating 7 to the exterior and the darkened heat absorbing coating 8 to the inside of the tent covering 1 as illustrated in FIG. 11.

In the function of rejecting unwanted rays, as performed by the reflective coatings, the latter may be supplemented by a layer of conventional heat-insulating material.

For summertime use the tent may be merely reversed as illustrated in FIG. 2 so that the transparent portion of the tent is "looking" to the cooler north and the reflective coating is to the south, southeast, or southwest so as to reflect the sun's rays away from the tent and help maintain the interior cool during the day. It will be noted that the reflective coating 7 is outermost so as to reflect the sunlight and heat away in either FIG. 5 or FIG. 6. In the event that sun's rays would be damaging to material 1 in FIG. 5, then a second reflective coating such a 7 can be applied to the exterior, as illustrated in FIG. 10, to prevent the rays from reaching material 1.

In FIGS. 3 and 4 one side may have reflective, heat-absorbing coatings and the other may be transparent as in FIGS. 1 and 2, with the ends being transparent or reflective as desired. Alternatively, one side may be reflective and the other side heat absorbing as described below, in reference to FIG. 7, with no transparent portion.

If it is desired to make the tent covering 1 of an opaque material such as canvas, then the coatings 7 and 8 will be applied slightly differently as illustrated in FIG. 7. Here, the darkened coating 8 is applied to the exterior surface on one side of the tent while the reflective coating 7 is applied to the exterior surface on the other side. Thus, when sun rays 4 strike dark side 8 they are converted into heat to warm the tent cover and thereby emit secondary infra-red heat rays 9 to the interior of the tent. Reflective coating 7 helps to prevent escape of these rays from the tent and thus it is warmed. For summertime use the tent is turned 180° about the vertical axis as described relative to FIGS. 1 and 2 and the sun's light and heat rays are reflected off by reflective coating 7 which is now turned toward the sun. In the event auxiliary heat is used, such as a campfire or heating stove, the coatings are still valuable inasmuch as they minimize radiations from warm objects such as 3, or the heating apparatus inside, to the colder exterior.

In some instances there may be a tendency for the shelter to overheat, say at mid-day, or the occupants may desire to sit in a shaded area while warmth is supplied to other portions of the shelter. FIG. 8 illustrates an embodiment incorporating an opaque or reflective area 10 wich may be darkened to afford shade and indirect heat, or may be reflective to reject solar radiation, thus keeping the occupants out of the direct sunlight. Some sunshine may be admitted, morning and afternoon, through clear or translucent areas 1. Otherwise, FIG. 8 is similar to FIG. 1.

For convenience of illustration and description we have referred to reflective and darkened surfaces or coatings. We have found that reflective aluminum paint and a black, non-reflective paint give good results as coatings 7 and 8 respectively. Obviously other materials may be used to achieve the desired results. For example, in FIG. 1 the left side may be made of Mylar or clear polyethylene while the right side may be made of black polyethylene or other black or gray material. As a further example, in FIG. 7 the left side may be made of black plastic or canvas while the right side may be made of reflective aluminum or such. Thus, we do not wish to be limited to the exact materials or arrangements set forth but desire to secure variations and modifications as may fairly fall within the scope of our invention.

In FIG. 9 we have illustrated apparatus for securing the top ends of the tent poles together. Inasmuch as five to sixteen tent poles are often used, the task of tying the crossing points of such a large bundle together is facilitated by apparatus illustrated at 11, 12, 13. The larger tent poles may have sockets 11 at the top ends thereof into which "pins" 12 may be inserted. These "pins" 12 may be conveniently formed of pipes, tubes or such, and may be tied together by flexible member 13, such as nylon rope for example.

Many other shapes and arrangements may be resorted to without departing from our teachings.

What we claim is:

1. A solar heated tent or shelter having an open framework, covering material to be supported by said open framework to enclose a volume of air inside to be heated, the covering having a surface on the inside and a surface on the outside, a first section of the cover having reflective insulation characteristics and extending peripherally over a substantial portion of the outside of the shelter substantially from top-to-bottom to reject solar energy when the cover is turned with such section toward incoming solar rays, a second section of the cover having solar energy trapping characteristics extending peripherally over a substantial portion of the outside of the shelter substantially from top-to-bottom to warm the volume of air enclosed by the covering material when the second section is turned toward incoming solar rays, thus rendering it unnecessary to turn the cover inside-out for alternate heat rejection and heat collection.

2. A solar shelter construction comprising a protective and solar heating covering to substantially enclose a space therebeneath, said covering comprising a large area of substantially transparent material on one side of the shelter extending peripherally over a substantial portion of said one side and substantially from top-to-bottom to admit solar energy to expose the enclosed space to incoming solar radiations, a portion of said radiations passing through and across said shelter and striking the inside of an opposing area of covering material, said opposing area of material extending peripherally over a substantial portion of the covering and being opaque and heat absorbing to receive said solar radiations which pass through and across said shelter, absorb them, and convert them ing infra-red heat rays back into said space to thereby warm said surface, said warmed surface, in turn, radiating infra-red heat rays back into said space to thereby expose the space to infra-red radiations, said warmed surface also warming the adjacent air and thereby setting convection currents into motion, the space thereby being warmed by solar radiations, infra-red heat radiations and convection currents of warmed air, and insulating material adjacent to said opposing area of covering material and positioned to retain heat inside of said space when solar energy is admitted through said area of substantially transparent material and to assist in keeping heat outside of said space when the shelter is set up in a position such that solar radiations strike said area of insulating material, and an area of opaque material interrupting said area of substantially transparent material to limit the amount of solar radiation which is admissible through said area of substantially transparent material and to thereby limit heat buildup in said shelter.

References Cited by the Examiner

UNITED STATES PATENTS

| | | | |
|---|---|---|---|
| 189,653 | 4/1877 | Pudigon | 47—26 |
| 505,354 | 9/1893 | Garbesi. | |
| 1,599,213 | 9/1926 | Coupal | 135—4 |
| 1,611,031 | 12/1926 | Henderson | 154—46 |
| 1,672,306 | 6/1928 | Coupal | 135—4 |
| 1,940,020 | 12/1933 | Schindler | 47—29 |
| 2,599,141 | 6/1952 | Taylor. | |
| 2,757,677 | 8/1956 | Denn | 135—3 |
| 2,777,253 | 1/1957 | Bensin | 47—1 |
| 2,808,027 | 10/1957 | Inghram | 119—23 |
| 2,818,875 | 1/1958 | Denn | 135—3 |
| 2,857,634 | 10/1958 | Garbade et al. | |
| 2,869,561 | 1/1959 | Harkness | 135—1 |
| 2,891,879 | 6/1959 | Rohrer | 117—160 |
| 2,918,709 | 12/1959 | Corcoran. | |
| 2,932,304 | 4/1960 | Voege et al. | 135—1 |
| 2,986,150 | 5/1961 | Torian | 135—1 |
| 3,072,920 | 1/1963 | Yellott | 126—271 X |

HARRISON R. MOSELEY, *Primary Examiner.*

ALBERT H. KAMPE, JOSEPH D. SEERS, *Examiners.*